United States Patent [19]

Peterson et al.

[11] 4,020,496
[45] Apr. 26, 1977

[54] SUPPORT FOR COMPONENTS OF AN AUTOMATIC FOCUSING SYSTEM

[75] Inventors: Dean M. Peterson; John C. Wittenberger, both of Littleton, Colo.

[73] Assignee: Honeywell Inc., Minneapolis, Minn.

[22] Filed: Nov. 11, 1975

[21] Appl. No.: 630,794

[52] U.S. Cl. .................................. 354/25; 250/204; 354/202; 356/4
[51] Int. Cl.[2] ..................... G03B 3/10; G03B 13/20
[58] Field of Search ............. 354/25, 31, 195, 202, 354/162–169; 352/140; 356/125, 4; 350/289, 299; 250/204

[56] References Cited

UNITED STATES PATENTS

| | | | |
|---|---|---|---|
| 3,581,644 | 6/1971 | Baker | 354/164 |
| 3,958,117 | 7/1975 | Stauffer | 354/25 X |

*Primary Examiner*—Joseph W. Hartary
*Attorney, Agent, or Firm*—Henry L. Hanson; Charles J. Ungemach

[57] ABSTRACT

A support for a camera automatic focusing system has two identical plates that form top and bottom covers of the support. The top plate has a plurality of spaced openings that are in alignment with identical spaced apart openings formed in said bottom plate. A pair of shafts are positioned to extend through a different pair of the aligned openings in the plates. A separate image transferring mirror and a focusing lever is mounted on each shaft between opposing flat surface portions of the cover plates. A separate washer is mounted about each of said shafts between a lower end of said mirror and its associated focusing lever. An image receiving module having a height greater than the combined height of the mirror and thickness of the washer allows each focusing lever to be moved freely for angular adjustment of the associated mirror. The module has aligned spaced apart bosses on its surfaces adjacent the cover plates. Additional pairs of aligned openings formed in the top and bottom cover plates are positioned in snug engagement with associated bosses on said module. A mechanical connection extends between said cover plates to retain said image receiving module and said mirrors in optical relationship.

18 Claims, 4 Drawing Figures

SUPPORT FOR COMPONENTS OF AN AUTOMATIC FOCUSING SYSTEM

BACKGROUND OF THE INVENTION

1. Field of the Invention

The invention relates to a support apparatus for optical assembles and more particularly to an apparatus for supporting the mirrors, prisms and other light image transferring and detecting devices that are used in camera automatic focusing and other automatic range finding devices.

2. Description of the Prior Art

Generally, prior art automatic focusing devices employ custom made bent retainer plates for attaching each of a plurality of image reflecting mirrors to separate precision molded supports. Each support is required to have a pair of especially made bearings so that a mirror can be mounted in a precise rotatable position, for example, on a camera housing. Since the retainer plate must be made to suit each mirror that it supports it is a costly item to manufacture and assemble. Since the aforementioned precision molded supports must be manufactured to a precise dimension these parts also are costly to manufacture. Also, the especially made bearings which are used to rotatably mount each mirror support are required to be machined to very precise tolerances, for example, between 0.0002 and 0.0003 inches, and are therefore, very costly items to manufacture.

SUMMARY OF THE INVENTION

It is, accordingly, an object of the present invention to provide an improved support apparatus for an automatic focusing system.

It is another object of the present invention to provide an improved support apparatus for an automatic focusing system as set forth, which obviates the shortcoming of the prior art supports.

It is a further object of the present invention to provide a support apparatus for an automatic focusing system which has many duplicate parts and that are easy and inexpensive to manufacture.

It is still a further object of the present invention to provide a support apparatus for an automatic focusing system which is made of parts so arranged with respect to one another manufactured to the fine tolerances required by prior art supports.

It is another object of the present invention to provide a support apparatus for components of an automatic focusing system that enables automatic focusing system components to be rapidly mounted in correctly aligned optical relationship with one another.

In accomplishing these and other objects there has been provided in accordance with the present invention a support for an automatic focusing system that has a pair of shafts each having an image reflecting mirror and a different one of two identical focusing levers mounted thereon. A pair of identical cover plates forming an enclosure, each have a pair of aligned openings at preselected locations thereon. The openings in the cover plates provide precisely aligned bearing surfaces upon which each shaft and its associated image reflecting mirror can be rotated by its focusing lever. A module forming an image detecting device is positioned in a preselected desired optical position with respect to the image reflecting mirrors. The module features pairs of spaced apart bosses, positioned on opposite surfaces of the module in cooperative relationship with associated aligned openings in each cover plate. Additional pairs of preselected aligned spaced apart openings in the cover plates and associated grooves on the opposite sides of the detecting device provide passageways through which retaining means can be inserted and locked in place. This allows the image detecting device to be readily mounted and retained in a precise and correctly aligned position with respect to the optical axis of rotation of each of the shafts about which the light image reflecting mirrors are rotated.

BRIEF DESCRIPTION OF THE DRAWINGS

A better understanding of the present invention may be had when the following detailed description is read in connection with the accompanying drawings in which.

DESCRIPTION OF THE PREFERRED EMBODIMENT

Figure 1:
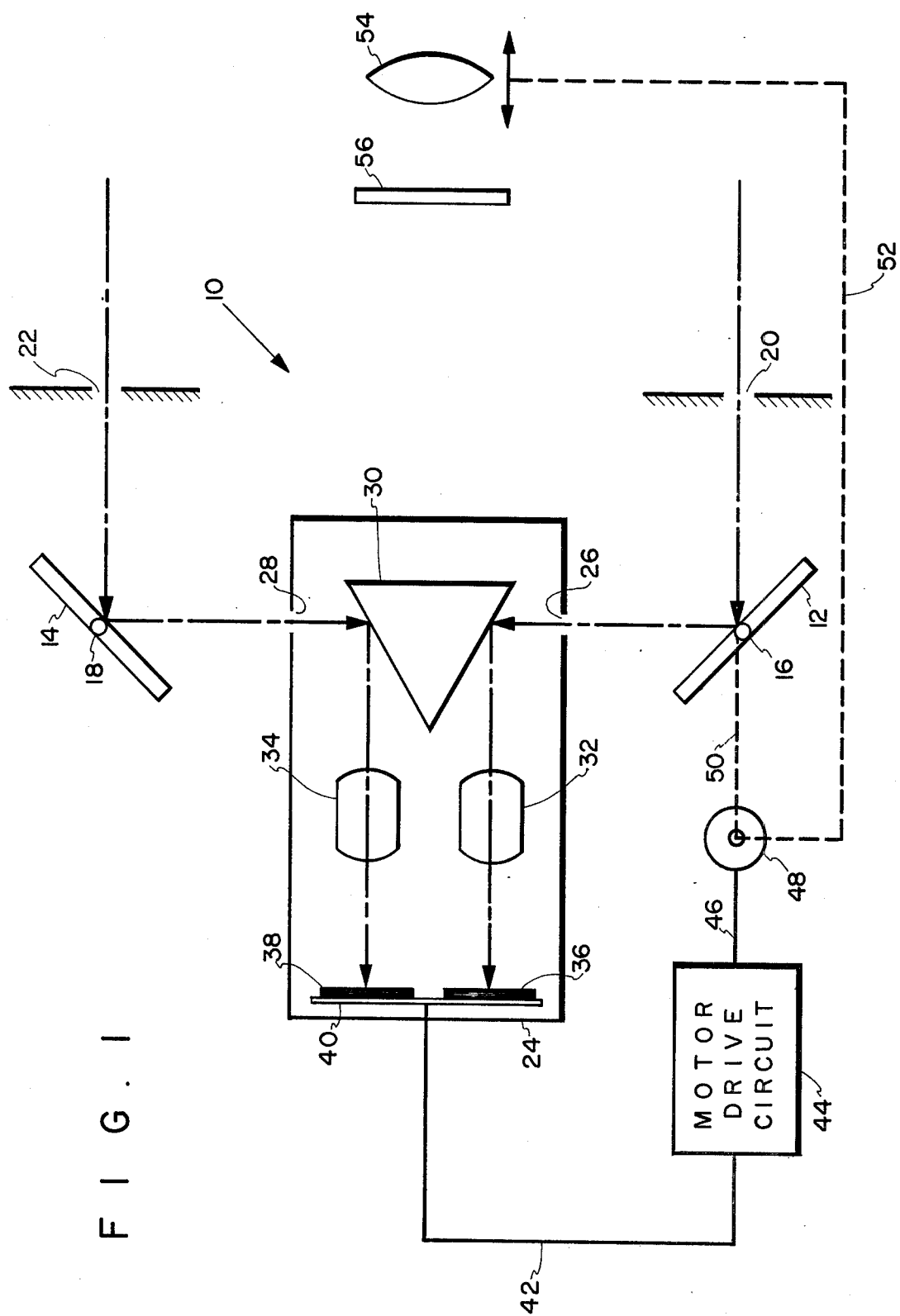
FIG. 1 shows a typical automatic focusing system.

Referring to the drawing, FIG. 1 illustrates an example of a typical automatic focusing system 10 in which the support apparatus of the present invention can be beneficially employed. This automatic focusing system is of the type that is disclosed in the application for U.S. Pat. of Norman L. Stauffer bearing Ser. No. 529,573 and filed Dec. 4, 1974. This automatic focusing system is comprised of a pair of light image transmitting mirrors 12 and 14 which are mounted on individually associated rotatable shaft 16 and 18, respectively. The system also includes separate image transmitting apertures 20 and 22 which are associated with mirrors 12 and 14, respectively, and a light image detecting module 24. The module 24 has a pair of field stop openings 26 and 28, a prism 30, a pair of auxiliary lenses 32 and 34, and first and second light image detecting means 36 and 38 mounted on an integrated circuit chip 40. A first conductor means 42 connects an output terminal of the chip 40 with a motor drive circuit 44. A second conductor means 46 connects the circuit 44 to a balancing motor 48. A first mechanical link 50 extends between the motor 48 and the rotatable mirror support shaft 16. A second mechanical link 52 extends between the motor 48 and an objective lens 54. The latter is arranged in cooperative relation with a light sensitive film 56.

Figure 2:
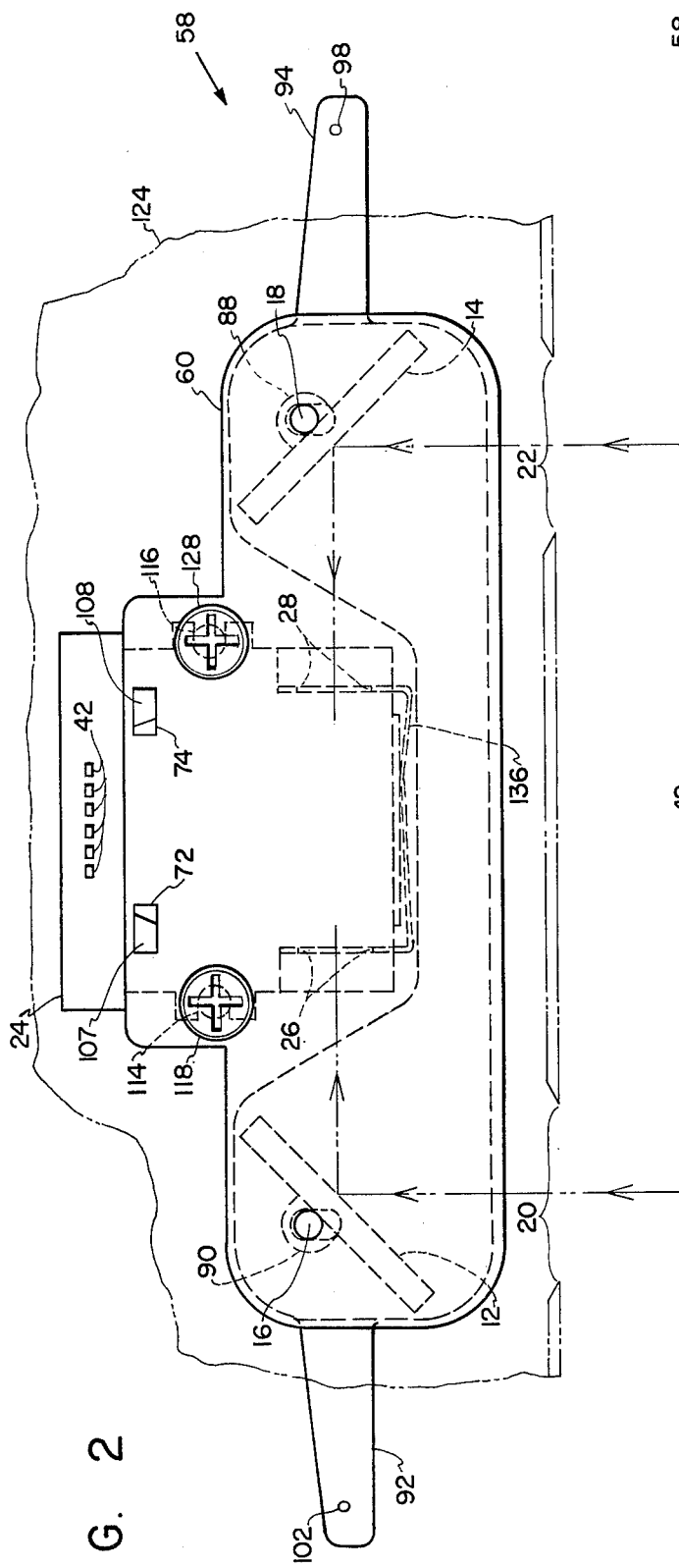
FIG. 2 is a plan view showing an apparatus for supporting the image transmitting and image detecting components that are employed in the automatic focusing system of FIG. 1.
Figure 3:
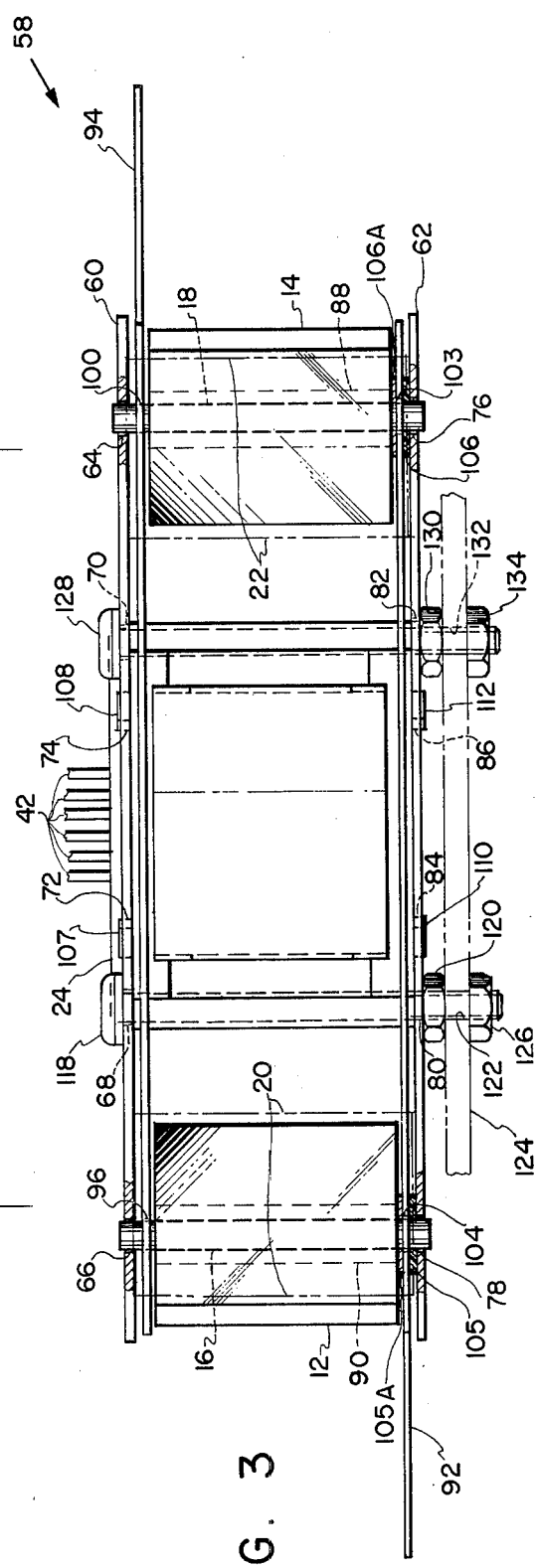
FIG. 3 is a partially sectional elevation view showing how each shaft is rotatably supported in the cover plates of FIG. 2
Figure 4:
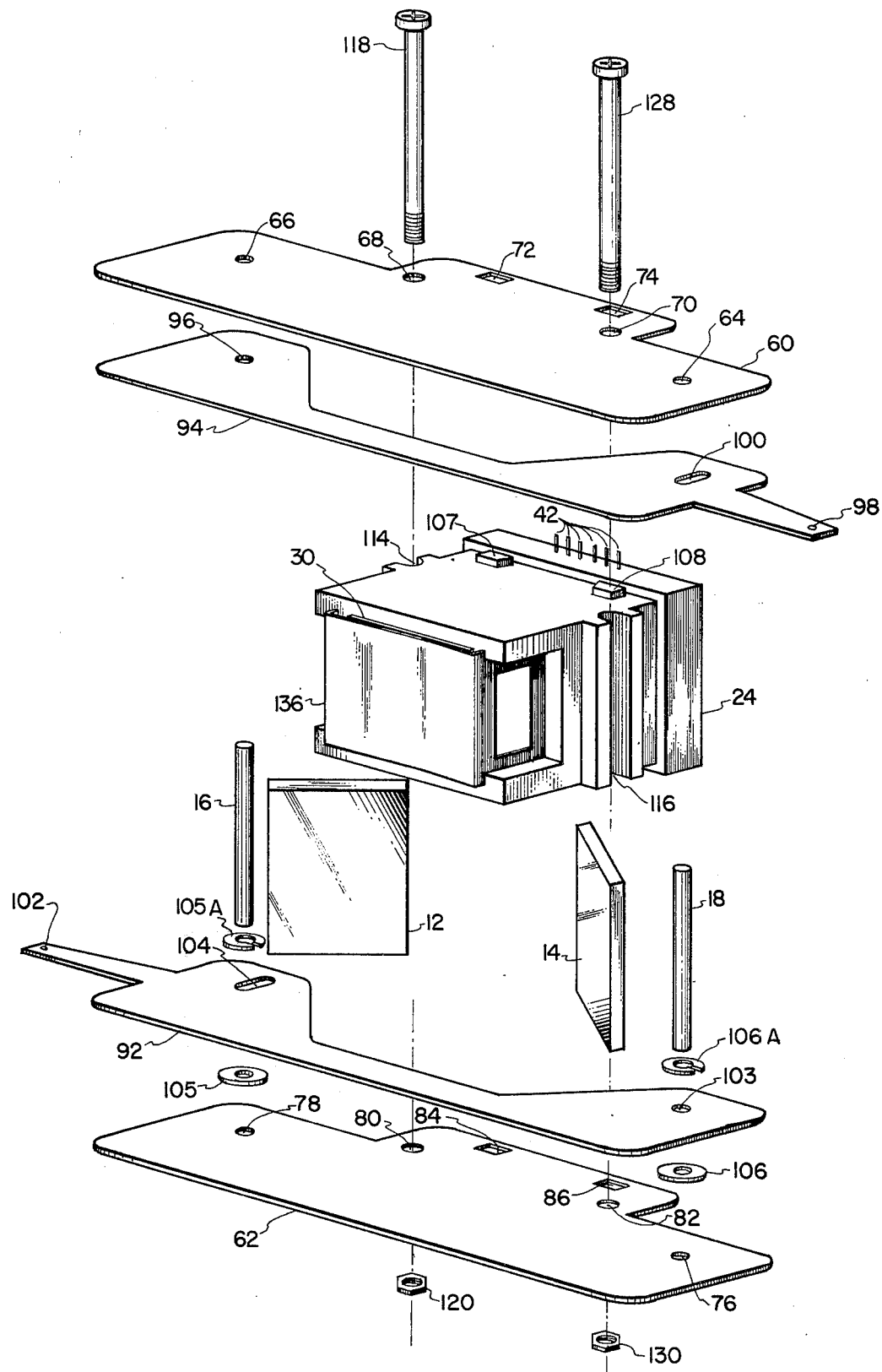
FIG. 4 is an exploded view showing in detail the supporting apparatus of FIGS. 2 and 3.

In accordance with the present invention there is provided, in FIGS. 2 to 4, a support apparatus 58. The support apparatus 58 is comprised of a pair of identical elongated inverted T-shaped cover plates 60, 62 blanked out of a sheet of material that is preferably steel. The cover plate 60 has four separate blanked out round openings or holes 64, 66, 68, 70, and two rectangular shaped holes 72, 74. All of these openings are positioned at the same locations as six other identical blanked out openings 76, 78, 80, 82, 84, 86 that are formed in the other cover plate 62.

The support apparatus 58 also has a pair of identical image reflecting mirrors 12 and 14. Each mirror is mounted on an identical steel shaft 16, 18. These shafts 16, 18 are preferably made of a commercially available drill rod material whose diametrical tolerance is 0.0001 inch. Each mirror 12, 14 is attached to its associated shaft 16, 18 by means of a suitable epoxy material 88, 90. The opposite ends of each one of the mirror supporting shafts 16, 18 are mounted for rotation in the openings 66, 78; 64, 76 in the cover plates 60; 62.

The support apparatus 58 also includes two identical elongated focusing levers 92, 94 that are blanked out of a sheet of material that is preferably steel. The focusing plate 94 has two blanked out round openings or holes 96, 98 and a slot 100 positioned at the same location as two other identical blanked out openings 103, 102 and slot 104 in the other plate 92. The wall forming the hole 96 in plate 94 is positioned about and is fixed to the shaft 16 by any suitable connecting means such as by welding or press fitting. The wall forming the slot 100 in the plate 94 is positioned over the other shaft 18. The walls forming the opening 103 and slot 104 in the other focusing plate 92 is positioned over respectively associated shafts 18, 16, and the plate 92 is welded or press fitted to the shaft 18.

As is best seen in FIG. 3, the lower end of shaft 16 passes through washers 105, 105A and an opening 78 in a cover plate 62. The lower end of shaft 18 also passes through washers 106, 106A and an opening 76 in cover plate 62. Parts 105A, 106A are spring washers.

A pair of identical spaced apart bosses 107, 108 and 110, 112 extend from the top and bottom flat surfaces of the image detecting module 24. The bosses 110 and 112 snugly engage the rectangular shaped openings 84 and 86 formed in the base cover plate 62. Similarly, the bosses 107 and 108 snugly engage the openings 72 and 74 formed in the top cover plate 60.

The module 24 has a pair of grooves 114 and 116 extending along each of its sides. A first connector screw 118 extends through the opening 68 in the cover plate 60, along the groove 114 in the module 24 and through the hole 80 in cover plate 62. A threaded portion of the screw 118 that extends beyond the plate 62 has a nut 120 that is in engagement with the plate 62. The connector screw 118 has a threaded end portion that extends through a hole 122 formed in a wall 124, the wall of a camera, for example, and a retaining nut 126 is mounted on the outer most end of the screw 118.

A similar second screw connection 128 extends in a similar manner to that just described through the opening 70 in cover plate 60 along groove 116 in the module 24, through opening 82 in cover plate 62, nut 130, a second opening 132 in the wall 124 and through a retaining nut 134.

Alternatively, the cover plates 60, 62 and module 24 can be inserted as a unit between two spaced walls of a camera to effect the retension of the cover plates in a clamped condition on the module instead of using the previously mentioned screws 118, 128.

The image detecting module 24 includes a substantially U-shaped spring plate 136 having wall portions that form apertures 26, 28 therein.

MODE OF ASSEMBLY

The support apparatus 58 for supporting automatic focusing systems is assembled in the following manner:

The openings 103 and 104 in the focusing lever 92 are placed over the lower end portion of the respectively associated shafts 16 and 18 and arranged so that the plate 92 is in a position as shown in FIG. 3. The lever 92 is fixed to the shaft by connecting the portion of the lever 92 which surrounds the opening 103 to the shaft 18. A suitable epoxy or welding material is used for this purpose. The other lever 94 is similarly positioned about the shafts 16, 18 and is fixed to the shaft 16 in the same manner as the lever 92 is fixed to its shaft 18.

Each one of the mirrors 12 and 14 extend between the focusing levers 92, 94 and are attached by a suitable adhesive or epoxy material 90, 88 to respectively associated shafts 16 and 18 in the manner shown as FIGS. 2 and 3. The levers 92, 94, shafts 16, 18 and mirrors 12, 14 comprise a subassembly of the support apparatus 58. After the subassembly including the mirrors 12, 14 and focusing levers 92, 94 have been mounted on the respectively associated shafts 16, 18, the lower ends of the spaced apart shafts 16, 18 are aligned with and passed through their associated washers 105, 106; 105A, 106A and their associated openings 78, 76 in the cover plate 62. Washers 105A, 106A act as tolerance absorbing elements. Alternatively, washers 105, 106 may be omitted.

The bosses 110, 112 extending from the base of the image detecting module 24 are aligned with and passed through associated rectangular openings 84, 86 in the cover plate 62. The openings 72, 74 in the top cover plate 60 are each aligned and arranged in non-rotatable engagement with a different one of the bosses 107 and 108.

A first screw 118 is passed through the opening 68 in the cover plate 60, groove 114 in the module 24, and the opening 80 in the cover plate 62. A second screw 128 is passed through the opening 70 and the cover plate 60 groove 116 in the module 24 in opening 82 in cover plate 62. The nut 120 and 130 is tightly threaded on the lower threaded end of their associated screw 118; 120. The heads of these screws 118, 128 and the nuts 120, 130 will thus retain the module 24 sandwiched between the inner flat sides of the cover plates 60, 62.

The supporting apparatus 58 is attached to the wall 124 of a camera by passing the lower end of each screw 118, 128 through suitable openings 122, 132 of this wall. A nut 126, 134 is then threadedly mounted on the end of each screw 118, 128 to retain the support apparatus 58 on the camera wall.

MODE OF OPERATION

After the support apparatus 58 is assembled in the aforementioned manner, the free end of the focusing lever 92 is adjusted in order to precisely position the shaft 18 and its associated mirror 14 to a desired reference position. The position to which mirror 14 is moved is described in more detail in the above-mentioned Stauffer patent application Ser. No. 529,573.

When the focusing lever 92, shaft 18, and mirror 14 have been located in the aforementioned precise reference position, an epoxy material, not shown, is applied between the upper and/or lower ends of the shaft 18 and their associated cover plates 60 and 62 to prevent the mirror from rotating from this reference position. This allows a first image to be transferred, in the direction of the arrows shown in FIG. 2, through the aperture 22 of the camera wall and by way of the mirror 14, prism 30 and the first auxiliary lens 34 to a first image detector 38 on chip 40, as seen in FIG. 1. This takes place while a second image is being transferred through a second aperture 20 in the camera wall, the second mirror 12, prism 30, and second auxiliary lens 32 to a second image detector means 36 that is also mounted on the chip 40. When the chip 40 senses any slight difference in the two images being transferred by mirrors 12, 14, a signal is sent by the chip 40 and conductor means 42, motor drive circuit 44 and conductor 46 to the motor 48. The latter adjusts the mechanical linkage 50 to move focusing lever 94 to alter the angular position of the mirror 12. Simultaneously, the mechanical linkage 52 is adjusted to move lens 54 to a new position. These adjustments eliminate any difference in the images transferred by mirrors, 12 and 14 to the chip 14, and simultaneously focuses the camera. The camera will then by in a correctly focused position, with no motor drive output from the chip 40.

The support apparatus 58 is particularly well suited for supporting image transfer mirrors 12 and 14 and the optical components as a unit and the image receiving module 24 in precise optical relationship to one another so that the images being transferred by the optical components will be directed to separate, very small, precisely defined image detecting areas of the chip 40. The transfer of each image to a precise extremely small detecting area of the chip must take place in order to properly carry out the aforementioned automatic focusing operation. Even if only small errors occur in the displacement of this transferred image on to the detecting areas 38 and 36 of the chip 40 for example, slop over of images on the chip areas, the automatic focusing apparatus will not operate properly to adjust the mirror 12 and the lens 54 of the camera for correct focusing.

Since the present invention provides automatic focusing component support apparatus for effecting the above-mentioned precise automatic focusing operation, and makes use of blanked out cover and focusing lever members and other readily procurable raw stock parts that are easy to handle, inexpensive to manufacture, and are readily assembled, the overall cost of manufacturing of such support apparatus is substantially less than the cost of the manufacture of the custom made prior art support devices.

The embodiments of the invention in which an exclusive property or privilege is claimed are defined as follows:

1. A support for an automatic focusing system comprising a pair of identical plates that are spaced apart and form an enclosure for said support, one of said plates having a plurality of openings that are in alignment with identical openings formed in the other plate, a pair of shafts positioned between said plates, each of said shafts extending through a different pair of said aligned openings in said plates, a separate image transferring mirror mounted on each of said shafts, and an image receiving module positioned between said plates, said module having a plurality of plate retaining bosses on its surfaces adjacent said plates, said plates having additional pairs of aligned openings to receive said bosses in snug engagement therewith.

2. The support as defined in claim 1 wherein each of said shafts are made of a drill rod material.

3. The support as defined in claim 1 wherein each of said plates and the openings therein are simultaneously cut out of a sheet of material by a single blanking operation.

4. The support as defined in claim 1 wherein a separate washer is mounted about each of said shafts between one of said plates and an adjacent end of its associated mirror.

5. The support as defined in claim 1 wherein a separate washer is mounted about each of said shafts between each one of said plates and an adjacent end of its associated mirror and wherein said image receiving module is of a greater height than the combined height of said mirror and washer.

6. The support as defined in claim 1 wherein a mechanical connection extends between said plates to retain said image receiving module in a correct optically aligned position with said mirrors.

7. The support as defined in claim 6 wherein said mechanical connection is a screw and nut connection and wherein the side of said module is provided with grooves for accommodating the passage of the shank of each of said screws therethrough.

8. The support as defined in claim 1 wherein one of said shafts has a focusing lever attached thereto for angularly displacing its associated mirror between one reference position and another and means for fixing said last mentioned shaft to at least one of its associated plates when said mirror is in said last mentioned position.

9. The support as defined in claim 1 wherein each one of said shafts has a separate focusing lever attached thereto for rotatably moving its associated mirror between one angularly displaced position and another.

10. The support as defined in claim 1 wherein each one of said shafts has a separate focusing lever attached thereto for rotatably moving its associated mirror between one angularly displaced position and another and wherein said levers are formed from two identical shaped plates that have an identical round opening and a slot that are spaced from one another at a distance to fit over a different associated shaft and the slot in each lever that surrounds a different one of said shafts are constructed to limit the angular movement through which each focusing lever can jointly rotate the associated shaft and mirror to which each member is attached.

11. The support as defined in claim 1 wherein each of said cover plates are of a inverted T-shaped configuration and each of said openings in said cover plate through which said shafts extend are positioned at spaced locations along the horizontal portion of each of said inverted T-shaped cover plates.

12. The support as defined in claim 1 wherein each of said cover plates are of an inverted T-shaped configuration and each of said openings in said cover plate through which each of said screws extend are positioned at spaced apart locations along a vertical portion of each of said inverted T-shaped cover plates.

13. The support as defined in claim 1 wherein each of said cover plates are of an inverted T-shaped configuration, each of said openings in said cover plate through which each of said shafts extend are positioned at spaced apart locations along the horizontal portion of each of said inverted T-shaped cover plates and each of said openings in said cover plate through which said screws extend are positioned at spaced locations along the vertical portion of each of said inverted T-shaped cover plates.

14. The support as defined in claim 1 wherein each mirror is of a plate shaped configuration, the non-reflecting side of each mirror is in line contact with a circumferential portion of each shaft and is attached by means of an epoxy material to its associated shaft.

15. The support as defined in claim 1 wherein each of said cover plates are of an inverted T-shaped configuration and said module is positioned between the vertical portion of each of said inverted T-shaped cover plates.

16. The support as defined in claim 1 wherein each of said cover plates are of an inverted T-shaped configuration and said shafts are positioned between the horizontal portion of each of said inverted T-shaped cover plates.

17. A subassembly for an automatic focusing system support, comprising a pair of spaced apart shafts, a separate image transferring mirror mounted on each of said shafts, a pair of focusing levers each focusing lever being attached at one of its ends to a different one of said shafts, the other end of each lever having a slot formed therein that is positioned over the other shaft to provide limited angular movement of each shaft.

18. The support as defined in claim 1 wherein one of said shafts has a focusing lever attached thereto for angularly displacing its associated mirror between one reference position and another and means for fixing said last mentioned shaft to at least one of its associated plates when said mirror is in said last mentioned position and wherein a separate spring washer is mounted about each of said shafts between said focusing plate and the end of each of its said associated mirrors.

* * * * *